United States Patent [19]

Takahashi

[11] Patent Number: 4,910,967
[45] Date of Patent: Mar. 27, 1990

[54] DEMIST CONTROLLER FOR AUTOMOBILE AIR-CONDITIONERS

[75] Inventor: Tadahiro Takahashi, Konan, Japan

[73] Assignee: Diesel Kiki Co., Ltd., Tokyo, Japan

[21] Appl. No.: 377,413

[22] Filed: Jul. 10, 1989

[30] Foreign Application Priority Data

Jul. 28, 1988 [JP] Japan ............................ 63-188969

[51] Int. Cl.⁴ .......................................... F25D 17/08
[52] U.S. Cl. ................................... 62/176.1; 62/161;
62/163; 62/244; 98/2.09; 165/17
[58] Field of Search ................ 62/176.1, 176.2, 176.6,
62/244, 150, 248, 161, 162, 163, 164; 98/2.09;
219/202, 203; 165/12, 17, 42; 340/601, 602;
236/44 R, 44 A, 44 E

[56] References Cited

U.S. PATENT DOCUMENTS

| 4,354,547 | 10/1982 | Sugiura | 62/164 X |
| 4,412,424 | 11/1983 | Iida et al. | 98/2.09 X |
| 4,448,034 | 5/1984 | Shimada et al. | 62/161 |
| 4,636,643 | 1/1987 | Nakamura et al. | 219/203 X |

Primary Examiner—Harry B. Tanner
Attorney, Agent, or Firm—Wenderoth, Lind & Ponack

[57] ABSTRACT

A demist controller for an automobile air-conditioner includes a demist judgement unit for judging the need for a demist operation based on the relative humidity in the vicinity of the inside surface of a window glass of the automobile, and a correction unit for automatically correcting criteria for a judgement by the judgement unit in accordance with starting and stopping instructions manually given by the driver as occasion arises.

3 Claims, 6 Drawing Sheets

DEMIST CONTROLLER FOR AUTOMOBILE AIR-CONDITIONERS

BACKGROUND OF THE INVENTION

1. Field of the Invention

The present invention relates to a demist controller for controlling the demist operation of an automobile air-conditioner for removing the mist from a window glass of an automobile or preventing formation of a mist on the window glass.

2. Description of the Prior Art

There are known demist controllers incorporated in automobile air-conditioners for removing the mist from a window glass of an automobile or preventing collection of a mist on the window glass. The known demist controllers include a humidity sensor for directly detecting the humidity in the vicinity of the inside surface of a window glass. The detected humidity is compared with reference values or criteria for automatically controlling starting and stopping of the demist operation of an automobile air-conditioner. Since the humidity sensor changes its impedance characteristics and capacitive characteristics as the time goes on, a correction of the criterion is necessary when the humidity sensor is used throughout the service life of the automobile.

To this end, a separate manual adjustment means is provided for manually changing the criteria for starting and stopping the demist operation of the air-conditioner, as shown in Japanese Patent Laid-open Publication No. 62-194929, for example.

In order to maintain a properly controlled demist operation for a long period of time, the manual adjustment means must be actuated periodically by a driver, a dealer or a manufacture for adjusting the criteria. Such frequent actuation of the adjustment means is tedious and time-consuming.

SUMMARY OF THE INVENTION

It is accordingly an object of the present invention to provide a demist controller for automobile air-conditioners which is capable of automatically adjusting criteria for starting and stopping the demist operation of an air-conditioner.

Another object of the present invention is to provide a demist controller capable of properly controlling the demist operation of an automobile air-conditioner for a long period of time without the need for a periodical manual adjustment of criteria used for the demist controlling operation.

A further object of the present invention is to provide a demist controller for automobile air-conditioners in which the user's desire is automatically reflected on the demist control operation.

According to the present invention, there is provided a demist controller for an automobile air-conditioner, comprising: humidity detection means for detecting a relative humidity in the vicinity of the inside surface of a window glass of an automobile; demist judgment means for making a judgment to determine whether a demist operation is needed, based on a comparison between outputs from the humidity detection means and predetermined criteria; control means for controlling starting and stopping of the demist operation of the air-conditioner according to a result of judgment by the demist judgment means; manual instruction means for manually instructing starting and stopping of the demist operation; and correction means for correcting the criteria in the demist judgment means to a higher side when a stopping of the demist operation is instructed by the manual instruction means while the demist operation continues, and for correcting the criteria in the demist judgment means to a lower side when a starting of the demist operation is instructed by the manual instruction means when the demist operation is suspended.

When the characteristics of the humidity sensor change as time goes on, a proper control of the demist operation cannot be achieved only by initially set criteria or starting and stopping timings of the demist operation. In this instance, the driver or an occupant would manually instruct the start and stop timings of the demist operation as occasion arises. Accordingly, by monitoring the presence of such manual instructions, it is possible to determine as to whether the criteria should be corrected. As described above, according to the invention, the criteria are corrected automatically by the correction means when the starting and stopping of the demist operation are manually instructed. With this correction of the criteria, a change in the characteristics of the humidity sensor can be taken up or cancelled.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

The present invention will be described herein below in greater detail with reference to certain preferred embodiments shown in the accompanying drawings.

Figure 1:
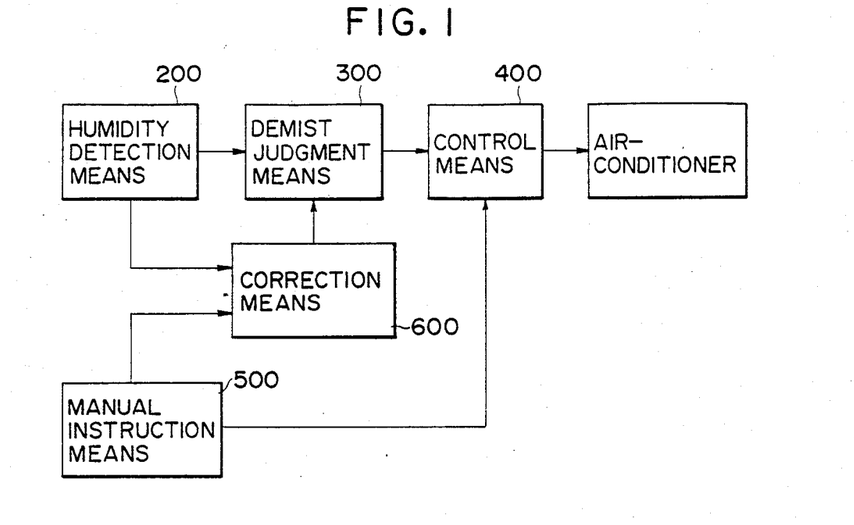
FIG. 1 is a block diagram showing the general construction of a demist controller for automobile air-conditioners according to the present invention.

FIG. 1 shows the general construction of a demist controller according to the prevent invention. The demist controller generally comprises: humidity detection means 200 for detecting a relative humidity in the vicinity of the inside surface of a window glass of an automobile; demist judgment means 300 for making a judgment to determine whether a demist operation is needed, based on a comparison between outputs from the humidity detection means 200 and predetermined criteria;

control means 400 for controlling starting and stopping of the demist operation of the air-conditioner according to a result of judgment by the demist judgment means 300; manual instruction means 500 for manually instructing starting and stopping of the demist operation; and correction means 600 for correcting the criteria in the demist judgment means 300 to a higher side when a stopping of the demist operation is instructed by the manual instruction means 500 while the demist operation continues, and for correcting the criteria in the demist judgment means 300 to a lower side when a starting of the demist operation is instructed by the manual instruction means 500 when the demist operation is suspended.

Figure 2:
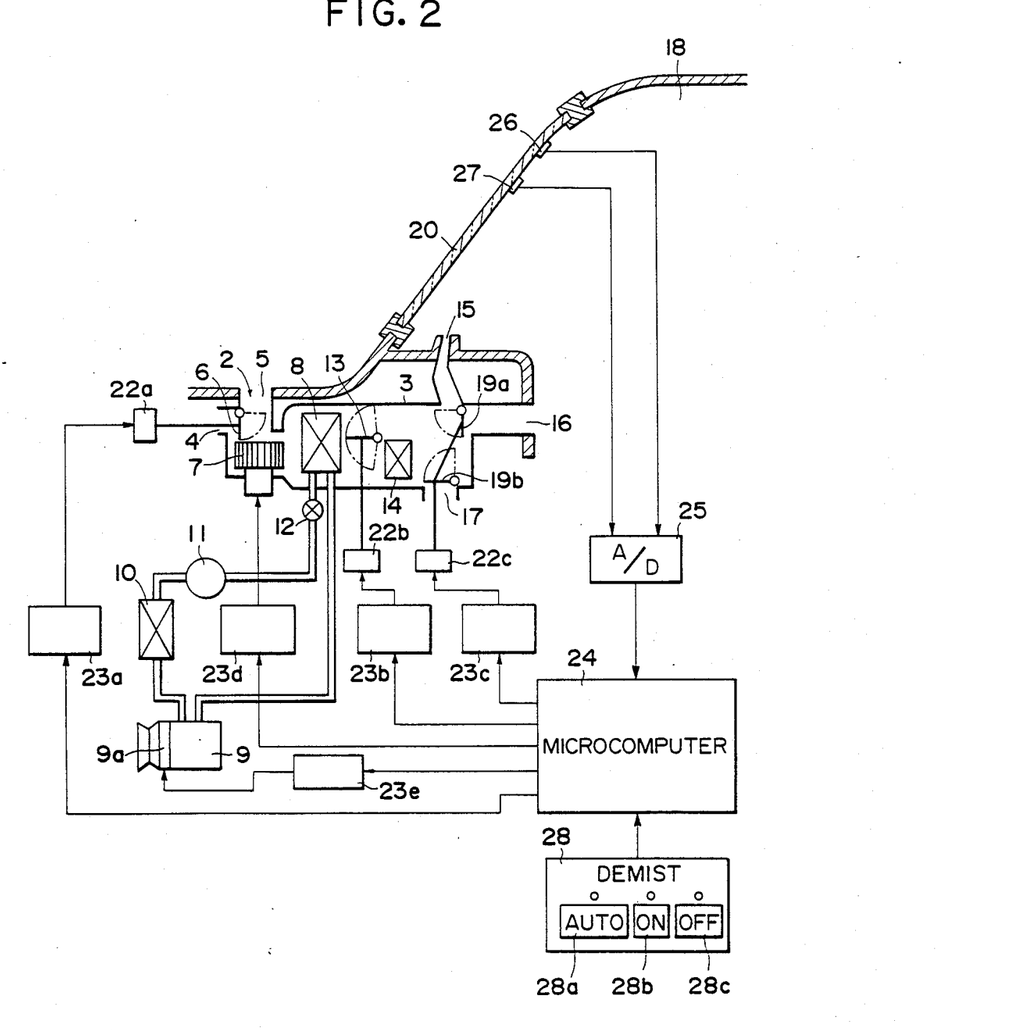
FIG. 2 is a diagrammatical view illustrative of the structural details of the demist controller incorporated in an automobile air-conditioner.

As shown in FIG. 2, the automobile air-conditioner incorporating the demist controller of this invention includes an intake door changeover device 2 disposed at an upstream end of an airflow duct 3. The intake door changeover device 2 includes a selecting door 6 disposed at the junction between are circulated air inlet 4 and an outside air inlet 5 that are provided in bifurcated fashion. The selecting door 6 is operatively connected to an actuator 22a and driven by the latter to select one of the inlets 4, 5 for allowing the recirculated air or the outside air to be drawn into the duct 3.

A blower 7 is disposed in the duct 3 immediately downstream of the changeover device 2 to force air to flow downstream through the duct 3. The duct 3 also includes an evaporator 8 and a heater core 14 disposed downstream of the blower 7 in the order named.

The evaporator 8 is connected in fluid circuit with a compressor 9, a condenser 10, a receiver tank 11, and an expansion valve 12 so as to constitute jointly therewith a refrigeration system in which a refrigeration cycle is performed. The compressor 9 includes an electromagnetic clutch 9a for selectively connecting the compressor 9 to an engine of a motor vehicle. The electromagnetic clutch 9a is engaged and disengaged to undertake an on-off control of operation of the compressor 9. The heater core 14 serves to heat air passing therearound through a heat exchange process between air and an engine cooling water recirculating through the heater core 14. An air-mix door 13 is disposed between the evaporator 8 and the heater core 14. The air-mix door 13 is operatively connected to an actuator 22b and driven by the same so that the angular position or opening of the air-mix door 13 is changed to vary the ratio of the amount of air flowing directly through the heater core 14 and the amount of air bypassing the heater core 14. Thus, the temperature of air to be discharged or blown-off from the duct 3 is controlled at a desired value.

The duct 3 has at its downstream end a defroster outlet 15, a vent outlet 16 and a heat outlet 17 that are provided in branched fashion and all open to a vehicle compartment 18. Two mode doors 19a, 19b are disposed at the respective junction between two adjacent ones of the outlets 19a, 19b to open and close the outlets 19a, 19b. The operation of the mode doors 19a, 19b is controlled by an actuator 22c for selecting a desired discharge mode of the air-conditioner.

The actuators 22a-22c, a motor of the blower 7 and the electromagnetic clutch 9a of the compressor 9 are controlled by the respective driver circuits 23a-23e based on output signals issued from a microcomputer 24. The microcomputer 24 is of the conventional type known per se and comprises a central processing unit (CPU), a read only memory (ROM), a random access memory (RAM) and an input/output port (I/O), neither shown. The microcomputer 24 is supplied with output signals from a glass temperature sensor 26 and output signals from a humidity sensor 27. The glass temperature sensor 26 is disposed on a portion of window glass 20 (windshield in the illustrated embodiment) confronting to the defrost outlet 15 for detecting the temperature $T_G$ of the inside surface of the windshield portion. The humidity sensor 27 is also disposed on the inside surface of the windshield 20 for detecting the relative humidity $H_G$ in the vicinity of the inside surface of the windshield 20. The output signals from these sensors 26, 27 are analog signals which are converted by an analog/digital (A/D) converter 25 into digital signal before they are inputted into the microcomputer 24.

The microcomputer 24 further receives output signals delivered from a demist control panel 28. The demist control panel 28 is provided with an AUTO switch 28a for issuing instruction signals to automatically start and stop the demist operation, an ON switch 28b adapted to produce an instruction signal for manually starting the demist operation when it is depressed, and an Off switch 28c adapted to produce a instruction signal for manually stopping the demist operation when it is depressed.

Figure 3:
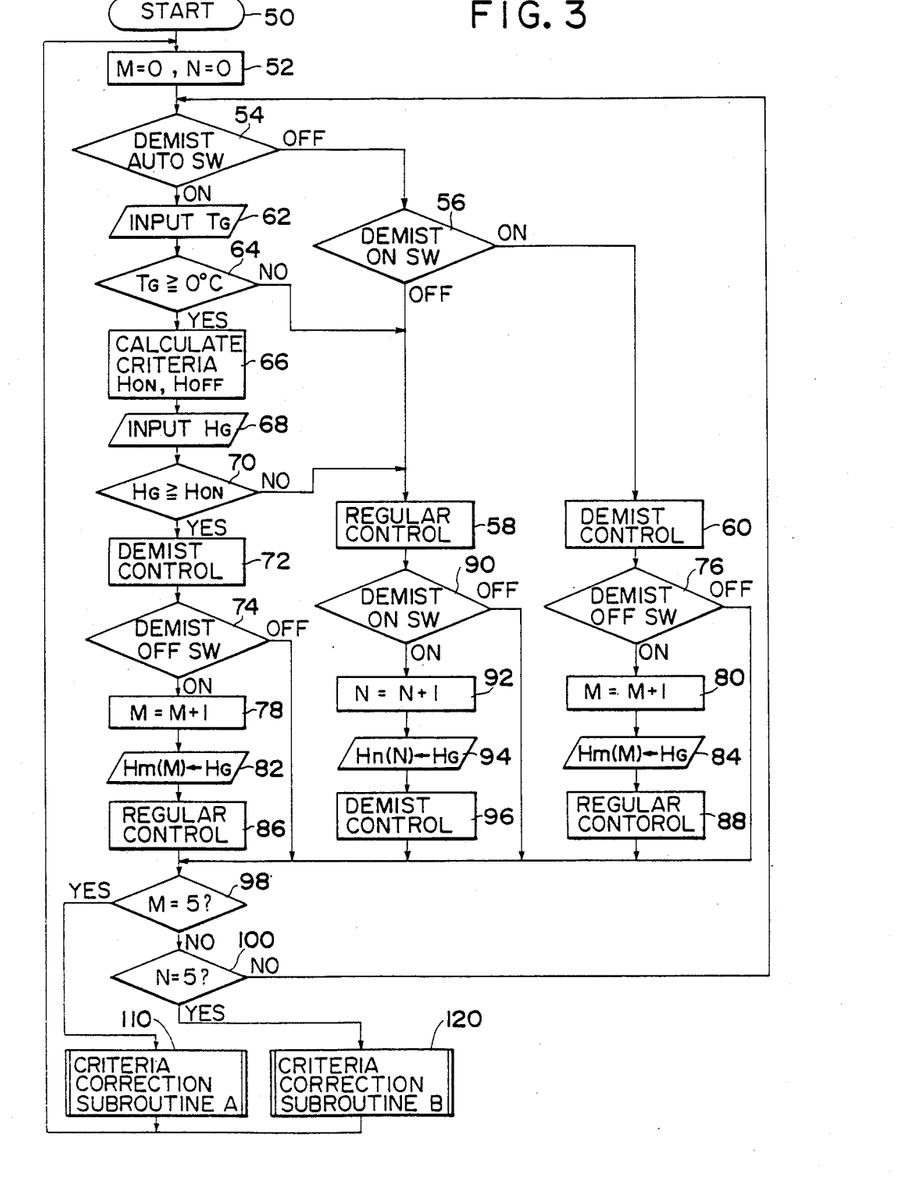
FIG. 3 is a flowchart showing a control main routine achieved in a microcomputer incorporated in the demist controller.

The operation of the microcomputer 24 will be described below with reference to a flowchart shown in FIG. 3 in which a control routine for the demist control operation of the automobile air-conditioner.

When a non-illustrated main switch is turned on, the control routine of the microcomputer 24 starts in a step 50 in accordance with a program stored in the microcomputer 24. In the next step 52, variables M and N are initialized to zero "0". Then the control goes to a step 54 in which a judgment is made to determine as to whether the AUTO switch 28a is depressed. If no, then the control proceeds to a step 56 in which a further judgment is made to determine whether the ON switch 28b is depressed. If the judgment in the step 56 indicates the OFF state of the On switch 28b, this means that the demist control is not necessary. The control therefore goes to a step 58 to undertake a known control (hereinafter referred to as "regular control") for maintaining the temperature in the vehicle compartment 18 at a set temperature based on deviations of the vehicle compartment temperature from the set temperature. If the judgment in the step 56 shows the ON state of the ON switch 28b, this means that the driver or an occupant of the motor vehicle is desirous of clearing up mists on the windshield 20. Then the control goes to a step 60 to start the demist operation (hereinafter referred to as "demist control").

Figure 6:
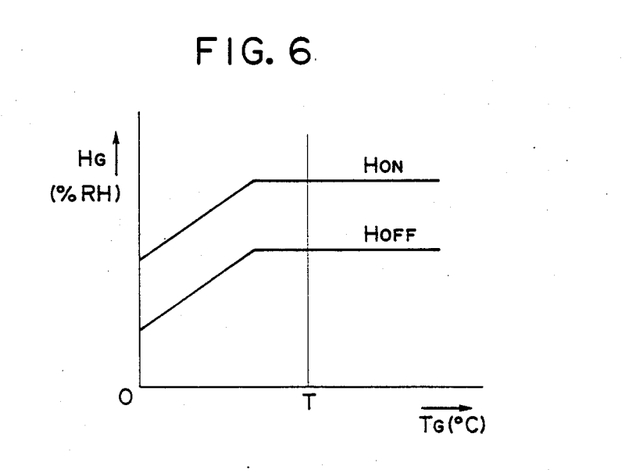
FIG. 6 is a graph illustrating the correlation between the temperature of a window glass and the relative humidity in the vicinity of the window glass.

In the case where the judgment in the step 54 indicates the ON state of the AUTO switch 28a, then the control proceeds to a step 62 in which a temperature $T_G$ on the inside surface of the windshield 20 detected by the glass temperature sensor 26 is inputted. This temperature is thereafter compared in a step 64 to determine whether $T_G$ is higher than 0° C. If $T_G < 0°$ C., this means that water vapor is condensed on the inside surface of the windshield and hence the detection of humidity is impossible. Then the control goes to the step 58 for achieving the regular control. In the case of $T_G \geq 0°$ C., the control proceeds to a step 66 for calculating a starting criterion $H_{ON}$ and a stopping criterion $H_{OFF}$ based on the detected temperature by using a predetermined pattern such as shown in FIG. 6. Thereafter, a relative humidity $H_G$ detected by the humidity sensor 27 is inputted in a step 68. The inputted relative humidity $H_G$ is compared with the starting criterion $H_{ON}$ in step 70. If $H_G < H_{ON}$, this means that the demist operation is still unnecessary. Accordingly, the control goes to the step 58 to continue the regular control. Conversely, if $H_G \geq H_{ON}$, then the control proceeds to a step 72 to start the demist control operation.

After the demist control is commenced by either automatically or manually, a judgment is made in steps 74 and 76 as to determine whether the OFF switch 28c is depressed or not. In case the OFF switch 28c is depressed, then control does to steps 78 and 80 in which the variable is renewed by adding a value "1". Then a relative humidity $H_G$ detected by the humidity sensor 27 when the OFF switch 28c is depressed is inputted and stored as a value Hm(M) in steps 82 and 84. Thereafter, the control mode is changed to the regular control in steps 86, 88 and the control proceeds to a step 98. If the judgment in the steps 74, 76 indicates the OFF state of the OFF switch 28c, the control jumps from the steps 74, 76 to a step 98.

After the step 58, a judgment is made in a step 90 to determine whether the ON switch 28b is depressed or not. If depressed, then the variable N is renewed by adding a value "1" in a step 92. Then a relative humidity $H_G$ detected by the humidity sensor 27 when the ON switch 28b is depressed is inputted and stored as a value Hn(N) in a step 94. Thereafter, the control mode is changed in a step 98 to thereby start the demist control and the control proceeds to the step 98. If the judgment in the step 90 indicates the OFF state of the ON switch 28b, the control jumps from the step 90 to the step 98.

In the step 98, a judgment is made to determine whether the variable M=5 or not, i.e., the OFF switch 28c is depressed five times during the demist control operation. If M=5, then the control goes to a step 110 for correcting the criteria $H_{ON}$, $H_{OFF}$ in such a manner as shown in a subroutine A shown in FIG. 4, and returns to the step 52. If M<5, the control proceeds to a step 100 in which another judgment is made to determine as to whether the variable N=5 or not, i.e., the ON switch 28b is depressed while the demist control operation is suspended. If M=5, then the control goes to a step 120 for correcting the criteria $H_{ON}$, $H_{OFF}$ in such a manner as shown in a subroutine B shown in FIG. 5. If N<5, the control returns to the step 54.

Figure 4:
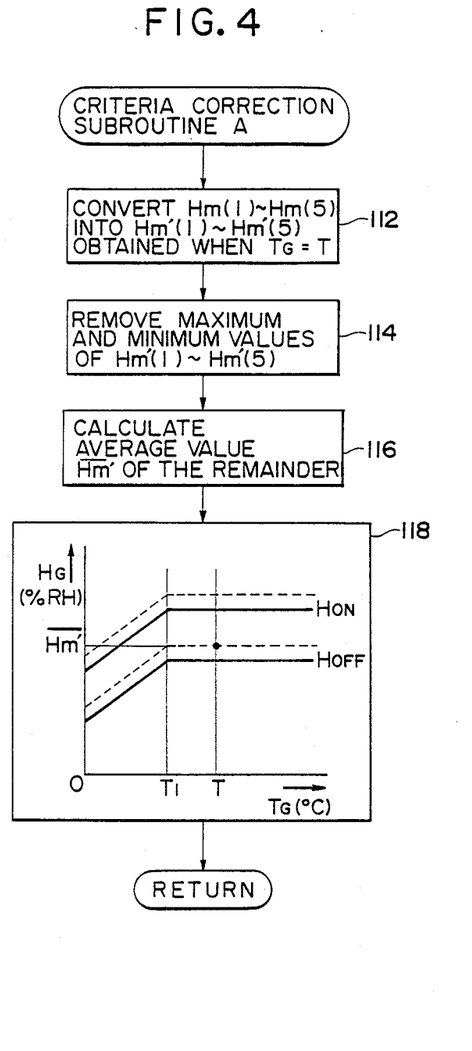
FIG. 4 is a flowchart showing a first control subroutine achieved for the correction of criteria used in the main routine shown in FIG. 3.

According to the subroutine A shown in FIG. 4, the Hm(1)—Hm(5) stored in the step 82 or the step 84 is converted into Hm'(1)—Hm'(5) which are obtained when $T_G$=T in a step 112. This conversion is carried out in a manner as described below.

For example, in the case where $T_G \geq T_1$ at the time of detection of Hm(1), the detected Hm(1) is regarded as Hm'(1).

In this case, $T_1$ is a predetermined value and a temperature on the inside surface of the windshield 20 at which is corresponding to inflection points on the respective characteristic curves of $H_{ON}$ and $H_{OFF}$ shown in a graph indicated by a step 118. In the case where $0 \leq T_G < T_1$, Hm'(1) is obtained in accordance with the following equation.

$$Hm'(1) = a(T_1 - T_G) + Hm(1)$$

where a is a constant which for example is equal to a gradient of inclined portions of the respective characteristic curves $H_{ON}$, $H_{OFF}$ in the graph obtained when $T_G < T_1$. Accordingly, if $0 \leq T_G < T_1$, Hm' is obtained in such a manner that a point of Hm corresponding to $T_G$ is displaced upwardly parallel to a portion of the characteristic curve of $H_{OFF}$ meeting a condition $0 < T_G < T_1$ until $T_G = T_1$, then a point on $H_G$ corresponding to $T_1$ indicates Hm'.

Hm(2) to Hm(5) are converted into Hm'(2) to Hm'(5), respectively, in the same manner as described above.

In the next step 114, among Hm'(1)—Hm'(5), a maximum value and a minimum value are dropped or removed and then an average value $\overline{Hm'}$ of the remainder is obtained in a step 116. The characteristic curves of $H_{ON}$, $H_{OFF}$ are displaced upwardly (as indicated by dashed lines) until a stopping criterion $T_{OFF}$ obtained when $T_G = T$ is equal to the average value $\overline{Hm'}$. Thus, the criteria are corrected and thereafter starting and stopping of the demist control operation are controlled by the corrected criteria $H_{ON}$, $H_{OFF}$.

Figure 5:
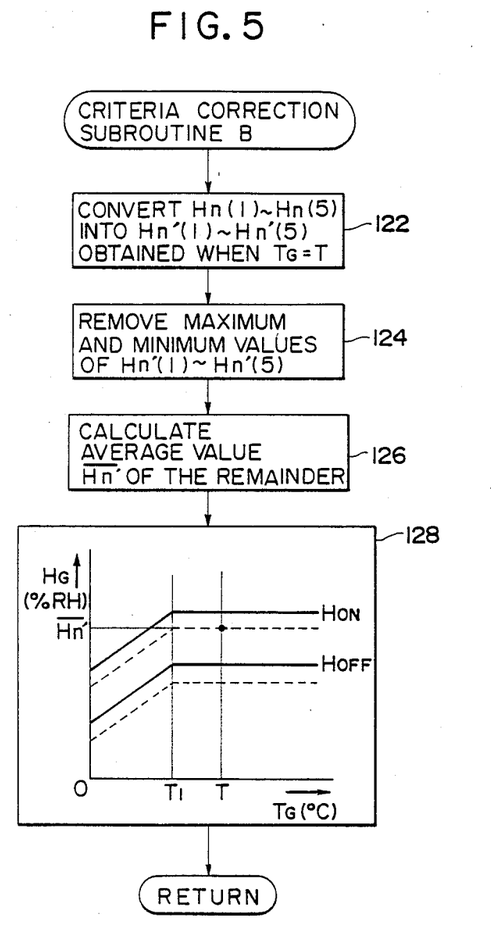
FIG. 5 is a flowchart showing a second control subroutine achieved for the correction of the criteria used in the main routine shown in FIG. 3.

According to the subroutine B shown in FIG. 5, Hn(1) to Hn(5) stored in the step 94 are processed in three consecutive steps 122, 124, 126 to obtain an average value $\overline{Hn'}$ in the same manner as described above with respect to the subroutine A. In the next step 118, the characteristic curves of $H_{ON}$ and $H_{OFF}$ are displaced upwardly (as indicated by dashed lines) until the stopping criterion $T_{OFF}$ obtained when $T_G = T$ is equal to $\overline{Hn'}$. Thus, the criteria are corrected and they are used to control the stopping and starting timing of the demist control operation.

As described above, the maximum and minimum values are dropped when average value is obtained in each of the step 116 and 126. This step is to remove a data which may be inputted when the ON switch 28b or the OFF switch 28c is depressed unintentionally dropped.

Figure 7:
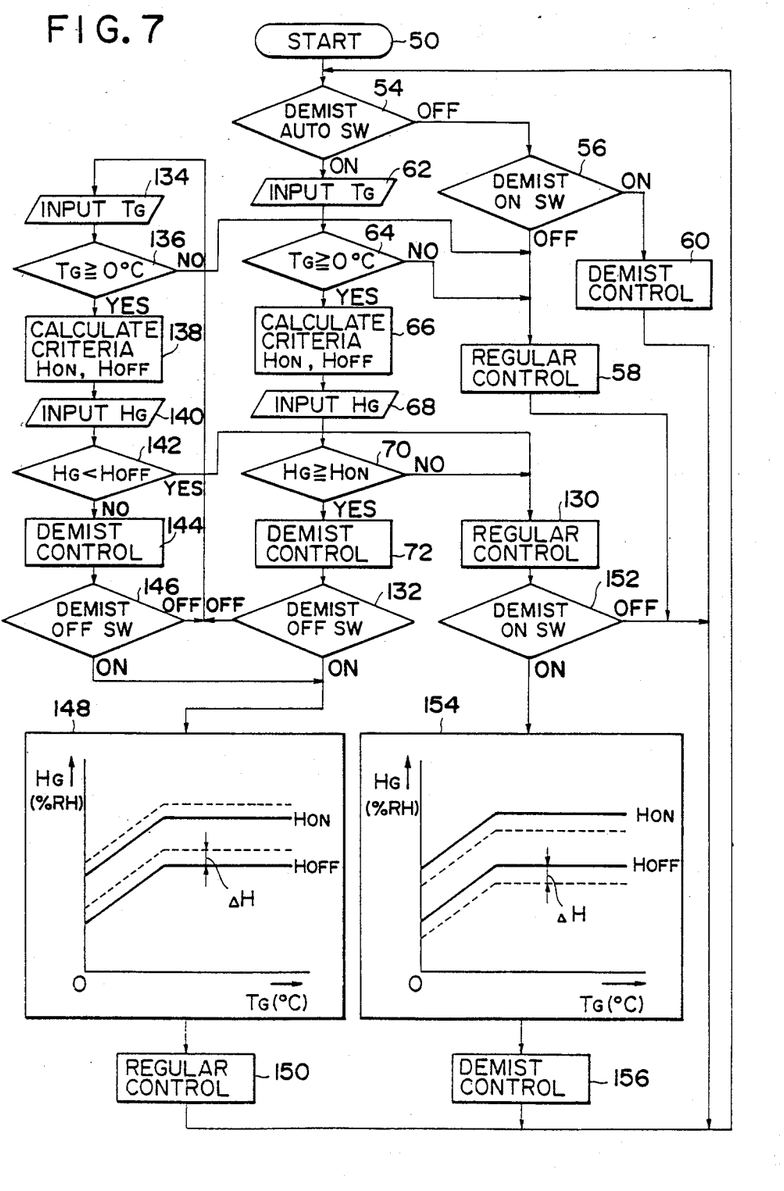
FIG. 7 is a flowchart showing the control routine achieved in another embodiment of the present invention.

FIG. 7 shows a flowchart illustrative of a control routine achieved by another embodiment of the present invention. The control routine contains steps 54 to 70 which are the same as the steps 54 to 70 described above with reference to the flowchart shown in FIG. 3. If a judgment in the step 70 indicates $H_G \geq H_{ON}$, the control proceeds to a step 72 to commence the demist control operation. Conversely, $H_G < H_{ON}$, the control goes to a step 130 to undertake the regular control operation. After the step 72, the OFF switch 28c is checked in a step 132 as to whether it is depressed or not. If the OFF switch 28c is not depressed, the control goes to a step 134 in which a glass temperature $T_G$ is inputted. Then a judgment is made in a step 136 to determine whether the inputted $T_G$ is greater than 0° C. If $T_G < 0°$ C., the control goes to the step 58 to change the operation to the regular control mode. Conversely, if $T_G \geq 0°$ C., the control proceeds to a step 138 to obtain a starting criterion $H_{ON}$ and a stopping criterion $H_{OFF}$ based on the glass temperature $T_G$ by using a predetermined pattern shown in FIG. 6. After the step 138, a relative humidity $H_G$ is inputted in a step 140 and the next step 142, $H_G$ is compared with the stopping criterion $H_{OFF}$. If $H_G < H_{OFF}$, the demist control operation is terminated and the control goes to a step 130 to change the mode of operation to the regular control. Conversely if $H_G \geq H_{OFF}$, the demist control operation is continued in a step 14. Thereafter, in a step 146, a judgment is made to determine as to whether the OFF switch 28c is depressed or not. If the OFF switch 28c is not depressed, then the control returns to the step 134 and the demist control operation is continued until $H_G < H_{OFF}$ is obtained.

In case the judgment in the steps 132, 146 indicates the ON state of the OFF switch 28c, this means that the present stopping criterion $H_{OFF}$ causes an over-demisting. Thus, the control proceeds to a step 148 in which the starting criterion $H_{ON}$ and the stopping criterion $H_{OFF}$ are parallel displaced upwardly by $\Delta H$. Thereafter, the control proceeds to a step 150 to change the mode of operation from the demist control to the regular control. The control finally returns to the step 54. After the step 130, a judgment is made in a step 152 to determine as to whether the ON switch 28b is depressed or not. If the ON switch 28b is depressed, this means that the present staring criterion $H_{ON}$ retards the starting timing of the demist operation. Accordingly, the control proceeds to a step 154 to parallel displace the criteria $H_{ON}$, $H_{OFF}$ downwards by $\Delta H$. Then the control proceeds to a step 156 to commence the demist control operation. If the judgment in the step 152 indicates the OFF state of the ON switch 28b, then the criteria $H_{ON}$, $H_{OFF}$ are not corrected and the control returns to the step 54 in the same manner as done in the case of the steps 58, 60.

In the embodiments described above with reference to the accompanying drawings, the correction of the criteria $H_{ON}$, $H_{OFF}$ is achieved by actuating the ON switch 28b and the OFF switch 28c. It is possible according to the present invention to replace the ON switch 28b with a DEF switch (not shown) which is used for setting the defrost mode.

Furthermore, in the illustrated embodiments, the staring criterion $H_{ON}$ and the stopping criterion $H_{OFF}$ are corrected simultaneously, however, they may be corrected separately. Yet, the correction may be made either one of the criteria $H_{ON}$, $H_{OFF}$ as occasion demands.

In the case where a rear window is demisted by automatically controlling the on-off operation of a heating wire embedded in the rear window based on output signals from a humidity sensor disposed on the rear window, criteria for the on-off operation of the heater wire may be corrected in the same manner as described with respect to the illustrated embodiments.

Obviously, various modifications and variations of the present invention are possible in the light of the above teaching. It is therefore to be understood that within the scope of the appended claims the present invention may be practiced otherwise than as specifically described.

What is claimed is:

1. A demist controller for an automobile air-conditioner, comprising:
    (a) humidity detection means for detecting a relative humidity in the vicinity of the inside surface of a window glass of an automobile;
    (b) demist judgment means for making a judgment to determine whether a demist operation is needed, based on a comparison between outputs from said humidity detection means and predetermined criteria;
    (c) control mans for controlling starting and stopping of the demist operation of the air-conditioner according to a result of judgment by said demist judgment means;
    (d) manual instruction means for manually instructing starting and stopping of the demist operation; and
    (e) correction means for correcting the criteria in said demist judgment means to a higher side when a stopping of the demist operation is instructed by aid manual instruction means while the demist operation continues, and for correcting the criteria in said demist judgment means to a lower side when a starting of the demist operation is instructed by said manual instruction means when the demist operation is suspended.

2. A demist controller according to claim 1, said demist judgment means comprising a predetermined characteristic pattern of the relative humidity in the vicinity of the inside surface of the window glass for determining the starting and stopping of the demist operation, said criteria being determined from said characteristic pattern.

3. A demist controller according to claim 2, said predetermined characteristic pattern is determined such that said criteria increase with an increase in the temperature on the inside surface of the window glass in a temperature range of between 0° C. and a predetermined temperature, and the criteria are constant at temperatures exceeding said predetermined temperature.

* * * * *